United States Patent [19]

Hutchinson et al.

[11] Patent Number: 5,018,266
[45] Date of Patent: May 28, 1991

[54] NOVEL MEANS FOR MOUNTING A TOOL TO A ROBOT ARM

[75] Inventors: James Hutchinson, Doylestown, Pa.; Brian Hoffman, Somerville, N.J.; Steven Pollack, Washington Crossing, Pa.

[73] Assignee: Megamation Incorporated, Lawrenceville, N.J.

[21] Appl. No.: 425,565

[22] Filed: Oct. 23, 1989

Related U.S. Application Data

[63] Continuation-in-part of Ser. No. 129,454, Dec. 7, 1987, Pat. No. 4,875,275.

[51] Int. Cl.⁵ ............................................. B23Q 3/155
[52] U.S. Cl. ........................................ 29/568; 901/41
[58] Field of Search .................... 29/568; 211/1.5; 901/31, 39, 41; 279/17, 93, 97

[56]   References Cited
U.S. PATENT DOCUMENTS

| | | | |
|---|---|---|---|
| 3,143,900 | 8/1964 | Oeckl et al. | 29/568 |
| 3,911,540 | 10/1975 | Johnson et al. | 29/568 |
| 4,588,339 | 5/1986 | Bilz | 29/568 |
| 4,636,135 | 1/1987 | Bancon | 29/568 |
| 4,875,275 | 10/1989 | Hutchinson et al. | 29/568 |

Primary Examiner—Z. R. Bilinsky
Attorney, Agent, or Firm—Louis Weinstein

[57]   ABSTRACT

A tool changer including male and female flanges for connecting end effectors to robot arms. A male flange having a tapered projection is inserted into a tapered opening in a female flange having a rod coaxial with the diameter of the tapered opening. A rotatable locking stud is aligned within an opening in the male projection and includes a slot having locking grooves at its lower end. The stud is rotated through an angle causing the male and female flanges to be drawn together until the cooperating tapers are seated together. A spring retains the flanges in the locked position. A cooperating pin and pin receiving socket respectively provided on the male and female flanges at locations displaced from the male and female tapers are utilized to assure proper orientation between flanges and to prevent rotation of the flanges. Electrical terminals on the male connecting flange engage cooperating conductive terminals on the female flange, providing an electrical path between electrical sources and load utilization devices on the end effectors. Pneumatic couplings are also provided between the male and female flanges. A plurality of removable flange identifying pins are arranged along the circumferential wall of the male flange for electrical engagement with cooperating sensors provided in each tool holder of a tool crib for identifying the type of end effector being stored. A single operator arm is provided in the tool crib for simultaneously moving the operating arms of all of the tools in the tool crib respectively to the engaged and disengaged positions.

33 Claims, 9 Drawing Sheets

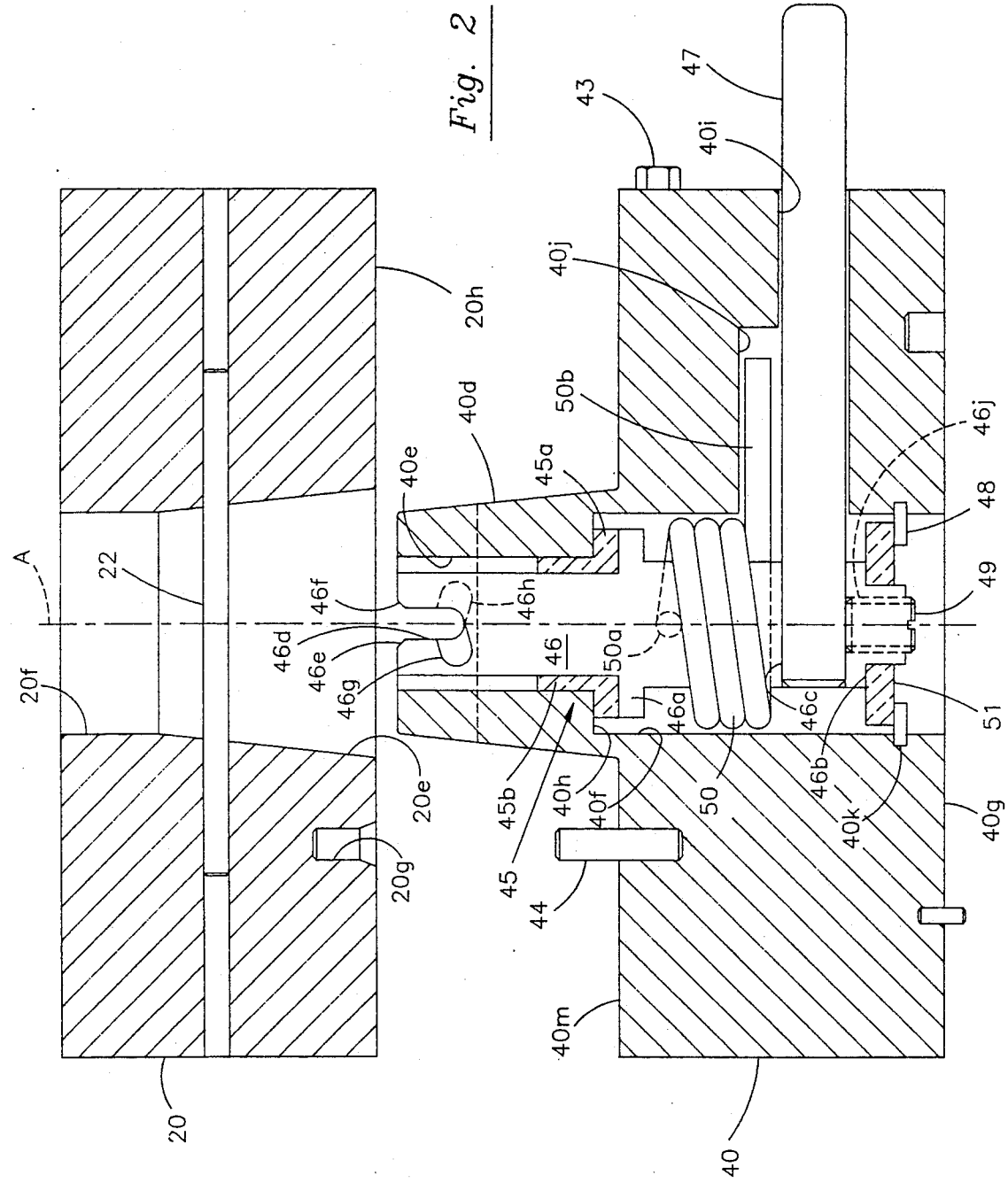

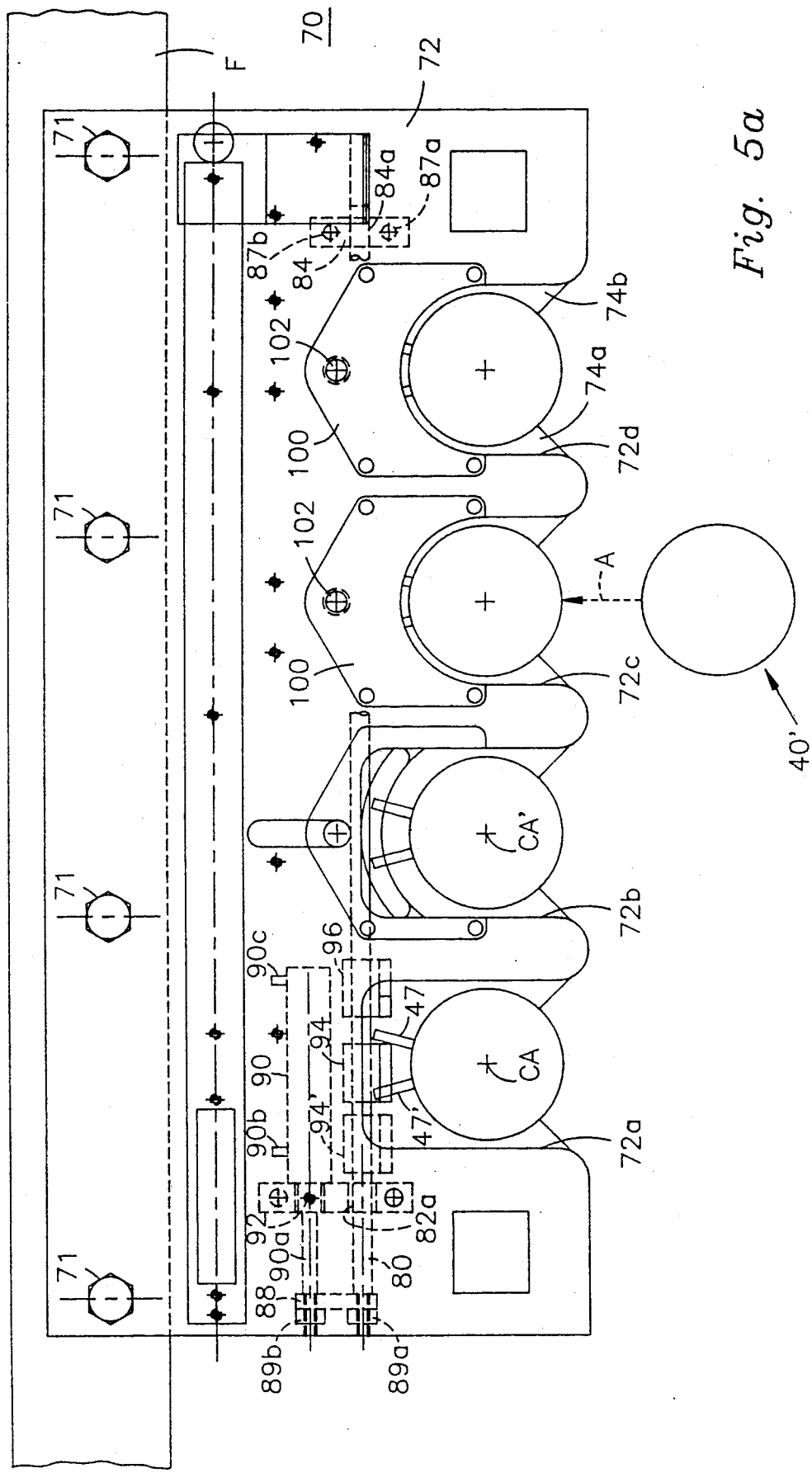

NOVEL MEANS FOR MOUNTING A TOOL TO A ROBOT ARM

This application is a continuation-in-part of U.S. application Ser. No. 129,454, filed Dec. 7, 1987, now U.S. Pat. No. 4,875,275.

FIELD OF THE INVENTION

The present invention relates to tool changers and more particularly to novel tool changers for coupling end effectors to robot arms of robotic systems, the coupling mechanism being small, light-weight and highly simplified in design while providing effective precision interlocking of mating flanges.

BACKGROUND OF THE INVENTION

Presently available automatic tool changers typically utilize an internal air cylinder to actuate a gripping mechanism for locking two mating flanges together. In another present day technique, an internal actuator is utilized to push a tapered cup over steel balls forcing them into a groove to obtain a locking action. In still another present day technique, tapered elements are rotated relative to one another to produce a locking effect through the employment of a eccentric collar. The major problem with present day tool changing devices is that they are typically large and heavy and the smaller units available on the market are incapable of providing an adequate number of electrical lines and pneumatic ports which is important in order to provide the capability of use with a variety of different end effectors.

BRIEF DESCRIPTION OF THE INVENTION

The present invention is characterized by providing small, light-weight high precision automatic tool changer apparatus with a minimum of working components.

The automatic tool changing apparatus of the present invention is comprised of cooperating male and female flange members respectively coupled to a robot arm and an end effector. The female flange is provided with a tapered opening and a coupling rod spanning the walls of said opening and aligned perpendicular to the longitudinal axis of the opening. The male flange is provided with a tapered projection which conforms to the taper in the female flange. The tapered projection is hollow and houses a locking stud provided with an elongated slot tapered at its upper end for guiding the aforementioned rod into the slot as the mating flanges are brought into engagement. The tapered projection is also provided with a pair of slots to enable the rod to be lowered into the locking stud. When the cooperating rod reaches the base of the slot in the locking stud, the stud is rotated through an angle of approximately 35 degrees, whereby diagonally aligned offset notches provided in said stud and communicating with the slot are brought into engagement with the rod, causing the rod to be urged downwardly, thereby bringing the male and female tapers into intimate engagement. A torsion spring prevents the locking stud from rotating once moved to the locked position whereby the cooperating tapers assure proper alignment and concentricity between the mating flanges and hence the robot arm and end effector.

A cooperating pin and pin receiving opening are respectively provided on the male and female flanges at locations displaced at equal distances from the mating tapers and are brought into engagement with one another to assure proper angular orientation between the flanges and further to prevent rotation of the flanges relative to one another. The female flange has no moving parts, greatly simplifying the robot arm assembly and eliminating the need for any control capability on the robot arm to effect coupling and decoupling.

Each of the flanges is fixedly secured respectfully to a robot arm and an end effector. The female flange couples electrical and pneumatic lines extending through the robot arm to outlets on a face of the flange adapted to be positioned in close proximity to the adjacent flange surface of the male flange. The male flange is provided with stationary electrical terminals and tapered openings for the pneumatic couplings which respectively cooperate with spring-loaded conductive members forming part of the electrical circuits and with tapered projections forming part of the pneumatic circuits, the tapered projections being provided with O-rings to form an air-tight seal with the cooperating tapered openings in the female flange when the two flanges are mated.

The cooperating male flange and end effector mounted thereto are stored within a tool crib when not in use and are oriented in a predetermined position to facilitate coupling with the robot arm. The pneumatic and electrical lines extend through the male flange to the end effector secured thereto to provide appropriate electrical and/or pneumatic power. The nature and/or type of end effector coupled to the male flange is sensed by suitable sensors provided in the wall of the tool crib, which sensors cooperate with selectively removable elements arranged at spaced intervals about the periphery of the male flange, there being a sufficient number of the aforesaid selectively removable elements to form a binary code representative of a large number of different type end effectors, enabling the sensor means to sense the nature of the end effector, some selections being a soldering iron, screw driver, and a variety of grippers for gripping different components such as micro chips, transformers, relays, impedance elements, and the like. The selectively removable elements may be changed in accordance with the end effector coupled to the male flange, it being understood that the male flange design renders it adaptable to any of the end effectors employed in the robotic system.

In still another embodiment of the present invention, the torsion spring in the male flange is eliminated and replaced by a wave spring which serves to hold the locking stud in the locked position with the locking pin by exerting a force counter to the pull-up force exerted by the locking stud and which further exerts a frictional force which restrains the actuator arm from movement. This preferred embodiment compensates for tolerances that are experienced in manufacturing of the flanges and provides an operating arrangement which experiences less wear.

The tool flange is preferably provided with a detent assembly for preventing movement of the operating arm in the locked position due to vibration and thus preventing accidental and undesirable unlocking of the female robot flange from the male tool flange.

The tool crib in which the automatic tool changers and cooperating end effectors are stored is provided with either solenoid-operated or pneumatically-operated means for simultaneously moving the operating arms of all of the tool changers within the crib, enabling a robot arm to be replaced or removed from one of the tool changers, thereby avoiding the need for separate selective operating signals for each of the individual tool changers.

In another preferred embodiment of the tool changer, a cylinder operates a common control rod provided with a plurality of pairs of toggle assemblies which cooperate with the operating lever arm for controlling the locking and unlocking of a tool to the cooperating robot arm female flange. Each toggle member of the pair of toggles is adapted to yield under the force of spring loading means in order to be aligned a lever arm between a cooperating pair of toggle members. The unit cycles in such a manner that the common rod is driven in a first direction and thereafter in a second direction in order to properly orient all of the tools arranged within the crib. Each tool is arranged within a substantially U-shaped receiving location provided with spring loaded members for maintaining a tool within its proper crib location and for aligning the tool therein. Each tool holder is provided with sensors for identifying the nature of the tool arranged therein.

OBJECTS OF THE INVENTION AND BRIEF DESCRIPTION OF THE FIGURES

It is, therefore, one object of the present invention to provide a novel tool changer arrangement for robotic devices and the like including tool crib means for storing tools preparatory to use and having means for automatically coupling and decoupling the tools to the robot arm through common operating means.

Still another object of the present invention is to provide a novel tool crib assembly for storing tools for selective coupling to robotic arms and including sensing means for sensing members on each tool device to identify the particular tool stored in each location.

Still another object of the present invention is to provide a novel tool crib assembly for coupling and decoupling each tool to an associated robot arm and employing toggle means movable against spring bias means to automatically align the lever arm of a tool regardless of the position of the lever arm when introduced into the tool crib.

Still another object of the present invention is to provide a novel tool crib assembly for coupling and decoupling each tool to an associated robot arm wherein the tool flange is provided with a detent to prevent moving of the locking arm to the unlocked position due to vibration.

The above as well as other objects of the present invention will become apparent when reading the accompanying description and drawing in which:

FIG. 2 is an exploded sectional view showing the cooperating male and female flanges of FIG. 1 in greater detail.

FIG. 5a is a top plan view of another preferred embodiment of the tool crib incorporating the principles of the present invention and adapted for accommodating the male flanges of FIGS. 1, 2 and 4.

FIG. 5b shows an elevational view of tool crib of FIG. 5a.

FIG. 5c shows a detailed view of a pair of toggle assemblies employed in the tool crib shown in FIG. 5a.

FIG. 5d shows a detailed elevational view of one tool crib location of the tool crib assembly in FIG. 5a.

FIG. 5e shows a left-hand end view of the rod and driving assembly of FIG. 5a.

FIG. 5f shows a right-hand end view of the rod and driving assembly of FIG. 5a.

FIGS. 5g and 5h are detailed side elevation and top views of one of the tool receiving slots of FIG. 5a.

FIG. 5i is a simplified schematic of an electrical circuit incorporating the LED of FIG. 5a.

DETAILED DESCRIPTION OF THE INVENTION

Figure 1:
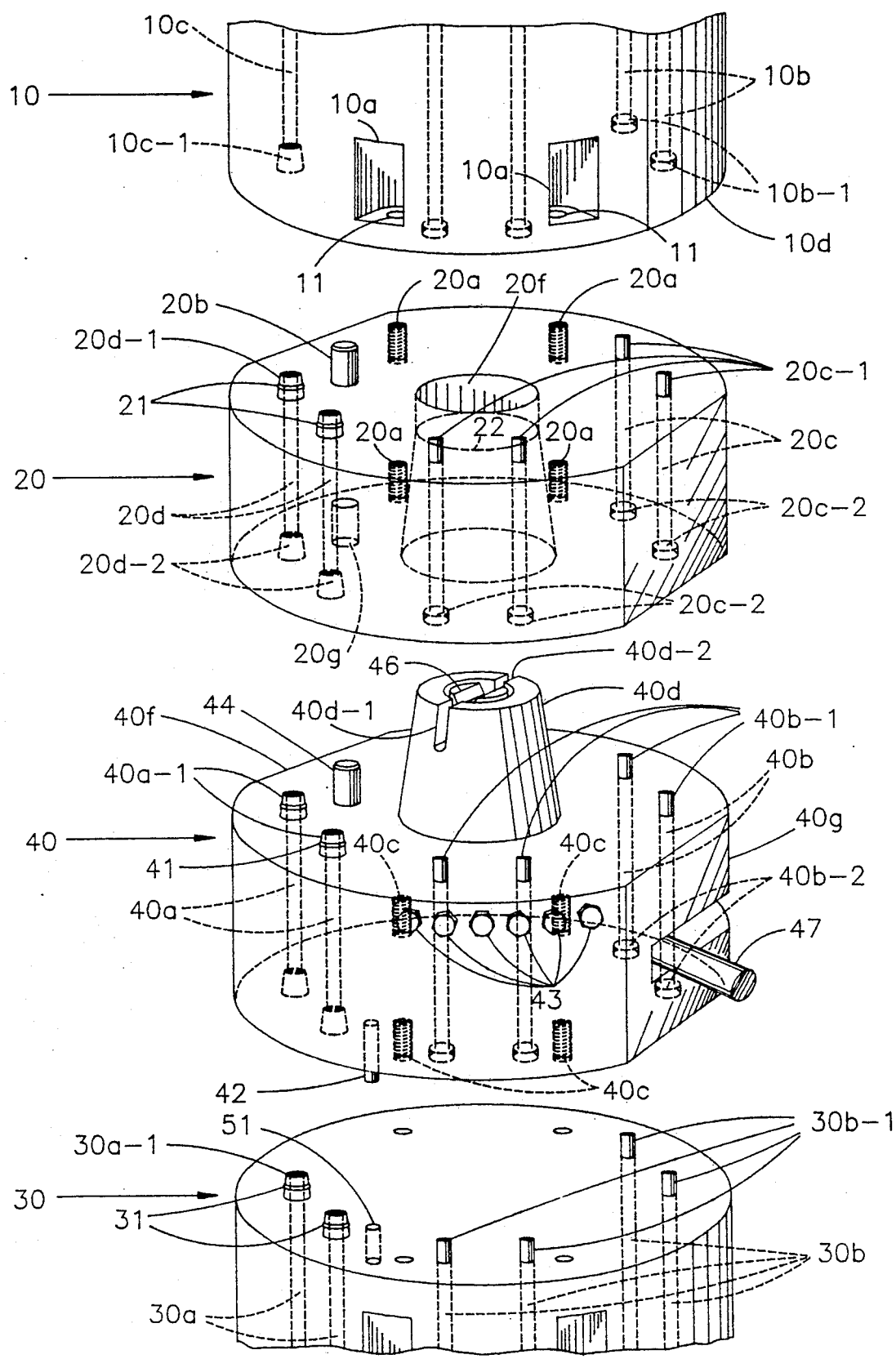
FIG. 1 shows an exploded perspective view of a portion of a robotic device employing the automatic tool changing apparatus of the present invention.

As was described hereinabove, the present invention is extremely advantageous for use in robotic devices wherein it is desired to provide automatic tool changing apparatus to enable simple, rapid changing of a tool, an end effector and a robot arm. A portion of the robot arm 10 is shown in FIG. 1 for purposes of simplicity and is secured to female flange 20 by means of threaded fasteners 11 arranged at spaced intervals about the flange coupling end of robot arm 10 and extending through openings provided therein. Recesses 10a are provided in the peripherial surface of robot arm 10 to facilitate insertion of the threaded fasteners 11 into vertically aligned openings. The threaded fasteners 11 are of a length sufficient to extend beyond the bottom surface of robot arm 10 so as to threadedly engage tapped apertures 20a provided in female flange 20. An orientation pin 20b extends upwardly from the top surface of female flange 20 for insertion into a cooperating opening (not shown) in the bottom surface 10d of robot arm 10 to assure appropriate angular orientation between members 10 and 20.

The robot arm 10 is provided with a plurality of electrical lines 10b coupled to electrical sources (not shown) and having stationary terminals extending slightly below the bottom surface 10d of the robot arm. As many as six (6) or eight (8) such electrical lines may normally be provided, only a few of said lines being shown in FIG. 1 for purposes of simplicity. These electrical lines are connected with electrical lines 20c in female flange 20 and specifically with spring-loaded, movably mounted conductive members 20c-1 which firmly engage an associated one of the stationary terminals 10b-1 to provide good electrical contact therebetween.

Pneumatic lines 10c extend through robot arm 10 and terminate in the bottom surface 10d thereof in the form of tapered openings 10c-1 which receive an associated tapered projection 20d-1 provided with an O-ring 21 for forming an air-tight seal between the cooperating tapers 10c-1 and 20d-1 when they are properly seated. The pneumatic lines 20d extend through the female flange and are provided with tapered openings which cooperate with tapered projections 40a-1 conforming to the tapered projections 20d-1 and provided with O-rings 41 for forming air-tight seals when projections 40a-1 are seated within tapered openings 20d-2. Pneumatic lines 40a extend downwardly to the bottom face of the male flange 40 to couple with tapered male projections 30a-1 provided with O-rings 31 for forming an air-tight seal when the cooperating tapered openings and projections are seated together. The pneumatic lines 30a extend to the device (not shown) forming part of end effector 30 which is operated by pneumatic pressure.

The male flange 40 is further provided with a plurality of spring-loaded conductive members 40b-1 which firmly engage associated ones of the stationary terminals 20c-2 extending just below the bottom surface of female flange 20. The electrical lines 40b extend through male flange 40 and are similarly coupled to electrical lines 30b in end effector 30 which lines are electrically connected to the stationary terminals 40b-2 extending just below the bottom surface of male flange 40 to provide electrical power to the end effector connected thereto through spring-loaded terminals and 30b-1 and lines 30b.

In the preferred embodiment, the number of pneumatic and electrical lines provided in the male and female flanges is preferably the maximum number. However, it should be understood that the end effector may utilize a lesser number of electrical and/or pneumatic lines dependent upon the function being performed by the end effector. However, it is advantageous to design the male and female flanges and especially the male flange to accommodate a variety of different end effectors, thus requiring a large number of electrical and pneumatic lines.

The end effector 30 is preferably joined to male flange 40 in a manner similar to the coupling between female flange 20 and robot arm 10. Male flange 40 is provided with a plurality of tapped openings 40c extending into the bottom face thereof for receiving threaded fasteners (not shown) similar to the threaded fasteners 11 described hereinabove for firmly securing male flange 40 to a mating portion of end effector 30. Proper orientation is achieved by means of pin 42 having its upper end integral with male flange 40 and its lower end extending downwardly for insertion into an alignment opening 31 provided in the mating surface of end effector 30.

Male flange 40 is further provided with a plurality of selectively removable members which may, for example, be threaded fasteners 43 formed of a suitable conductive material. The conductive members 43 are arranged at spaced intervals along an imaginary circle about the periphery of male flange 40 and collectively form a multiple bit binary code in which one binary state is represented by the presence of a conductive member and the opposite binary state is represented by the absence of the conductive member at each position. For example, providing six (6) such positions, a binary code of 64 different combinations can be provided to accommodate a variety of up to 64 different end effectors. These conductive member positions are sensed by sensor means provided in the tool crib to be more fully described hereinbelow to automatically and uniquely identify each end effector stored in the tool crib.

FIG. 2 is a sectional view showing the male 40 and female 20 connectors in greater detail and is principally confined to a showing of the elements thereof which cooperate to provide the automatic coupling and decoupling.

More specifically, female flange 20 has a central opening comprised of a lower tapered portion 20e which reduces to a smaller diameter and which communicates with upper opening portion 20f of substantially constant diameter A hardened steel pin or rod 22 has its opposite ends anchored within the female flange member and extends across the upper portion of the tapered opening 20e. Pin 22 is perpendicular to the longitudinal axis A of the opening extending through female flange 20 and lies along a diameter thereof.

The alignment opening 20g cooperates with alignment pin 44 provided on male flange 40 and is positioned a predetermined displacement distance offset from female taper 20e.

Male flange 40 is provided with a tapered projection 40d which taper substantially conforms to the taper of tapered opening 20e in female flange 20. An opening 40e extends through the tapered projection and increases to a larger diameter opening 40f which extends to the bottom surface 40g of male flange 40. A shoulder 40h arranged between the smaller and larger diameter openings 40e and 40f seats a bushing 45 whose flange portion 45a rests upon shoulder 40h and whose hollow cylindrical portion 45b extends upwardly into opening 40e so as to slidably engage stud 46 which extends into bushing 45 and is provided with a flange 46a which rests against and slidably engages flange 45a of bushing 45. The lower end of stud 46 is provided with a recess 46b which seats a thrust bushing 51 which is held in place by resilient C-clip 48, retained in position in an annular recess 40k provided in the inner periphery of opening 40f at the lower end thereof. Thus, bushing 45, C-clip 48 and thrust bushing 47 serve to retain locking stud 46 against any linear movement relative to female flange 40 while permitting angular rotation thereof.

Locking stud 46 is provided with an opening 46c receiving the left-hand end of an operating arm 47 comprised of an elongated rod which extends toward the right through an opening 40i in male flange 40 so as to be rotatable through an angle of the order of 35 degrees. Operating arm 47 is secured to locking stud 46 by set screw 49 threadedly engaged within a tapped opening 46j provided in the lower end of locking stud 46 which protrudes through the central opening provided in thrust bushing 51.

Tapered projection 40d has a pair of diametrically opposed slots 40d-1, 40d-2 (see FIG. 1) for receiving rod 22 as will be more fully described.

An helically wound torsion spring 50 is wrapped about an intermediate portion of locking stud 46 and has its upper end 50a extending into an opening in locking stud 46 thereby securing the upper end of torsion spring 50 to locking stud 46. The opposite (lower) end 50b of torsion spring 50 extends into a recess 40j provided in male flange 40.

The upper end of locking stud 46 is provided with a slot 46d arranged along a diameter of locking stud 46 and having bevelled edges 46e, 46f at the upper end thereof to aid in the guiding of pin 22 into slot 46d. The lower end of slot 46d is machined to provide two diagonally aligned slots 46g, 46h which communicate with the lower end of vertically aligned slot 46d and extend diagonally downward and away from slot 46d for receiving and embracing pin 22 in a manner to be more fully described.

Figure 2A:
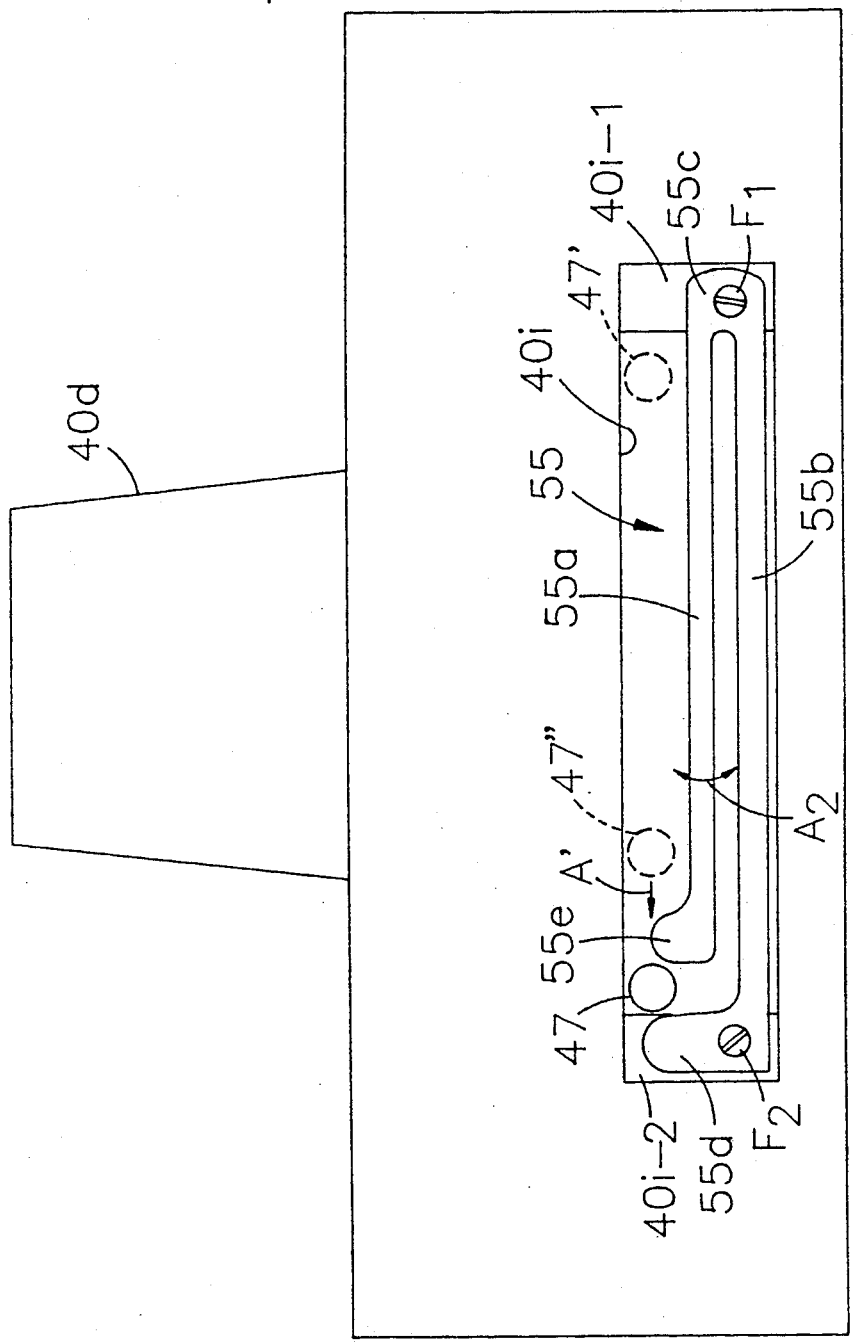
FIG. 2a shows an elevational view of the female flange of FIG. 1 provided with a detent means for preventing unlocking of the tool flange due to vibration.

FIG. 2a shows the manner in which a detent assembly 55 may be provided in order to prevent movement of the locking pin 47 to the unlocked position due to vibration. The slot or opening 40i in tool flange 40 is of a height sufficient to position detent assembly 55 therein. Recessed mounting surfaces 40i-1 and 40i-2 provided at opposite sides of the slot 40i are used as mounting surfaces for the detent assembly which is comprised of a substantially U-shaped detent member 55 formed of a suitable semi-resilient plastic and comprised of detent arms 55a and 55b integrally joined to a yoke portion 55c secured against mounting surface 40i-1 by a threaded fastener $F_1$. The left-hand end of arm 55b is provided with an upwardly projecting portion 55b. A threaded fastener $F_2$ securely mounts the detent member to the left-hand mounting surface 40i-2. The left-hand end of arm 55a is provided with an upwardly extending rounded projection 55e.

The manner of operation of the detent assembly is as follows:

The locking arm 47 normally occupies the dotted line position 47' when the tool flange is in the unlocked condition. In order to lock the tool flange to the robot flange (once they are properly mated as shown, for example, in FIG. 3), the locking arm is moved from the dotted line position 47' toward the left as shown by arrow $A_1$ the position 47''. As the locking arm moves further to the left, it engages rounded projection 55e causing the free, left-hand end of arm 55a to move downwardly or rotate in the counterclockwise direction about the yoke portion 55c, in order that the rounded projection 52e may move out of the path of movement of locking arm 47''. The force applied to the locking arm 47 by the tool crib actuating arm is more than sufficient to move arm 55a. Once the locking arm reaches the locked position 47 shown in solid line fashion, it is clear of rounded projection 55e, enabling the arm 55a to snap upwardly to its normal position as shown in solid-line fashion in FIG. 2a. At this time, the locking arm 47 occupies a position between the projections 55d and 55e. Any vibration which may tend to cause locking arm 47 to move toward the unlocked position is counteracted by the detent assembly and specifically by the rounded projection 55e. The detent is nevertheless sufficiently yieldable to enable the projection 55e to be moved out of the path of locking arm 47 when moved toward the position 47'' by the tool crib actuating arm, thus providing a detent which prevents accidental locking or unlocking of the tool flange from a mating robot flange while at the same time permitting normal intentional movement of the locking arm between the locked and unlocked positions under control of the tool crib actuating arm.

The operation of the releasable locking mechanism is as follows:

The robot having the robot arm 10 and female flange 20 mounted thereto is moved over the male flange 40 arranged within the tool crib 60 (to be more fully described) and is moved to bring the female taper 20e directly above and into alignment with the male tapered projection 40d. The robot arm 10 is lowered and rotated to bring pin 22 into alignment with slots 40d-1 and 40d-2 and with slot 46d (which is aligned with slots 40d-1 and 40d-2). The robot arm is lowered to lower pin 22 into slots 40d-1 and 40d-2 and the base of slot 46d. Appropriate alignment between the flanges 20, 40 is assured through the entry of alignment pin 44 into cooperating alignment opening 20g whose entry portion is tapered to facilitate guidance of the alignment pin 44 into the opening 20g. Once the pin 22 is seated against the base of slot 46d, operating arm 47 is moved (by means to be more fully described) to rotate locking stud 46 about its longitudinal axis causing pin 22 to be urged downwardly as it enters into the diagonally aligned slots 46g and 46h. The rotation of locking stud 46 causes the flanges 20 and 40 to be drawn together until the tapers 20e-40d are seated together. When the tapers are seated together there remains a gap of approximately 0.010 inch between the adjacent faces 20h-40m of the two flanges. Thus, the flanges do not rely on surface flatness of surfaces 20h, 40m for accuracy in alignment but rely on the tapers 20e-40d for assuring concentricity and perpendicularity therebetween. The flanges are prevented from rotating by pin 44 which is inserted into cooperating locating pin 20g. In addition to preventing rotation between flanges 20 and 40 pin 44 and opening 20g, in cooperation with the tapers 20e and 40d, assure appropriate orientation and alignment between the pneumatic and electrical terminals of female flange 20 and the cooperating pneumatic and electrical terminals of male flange 40.

Torsion spring 50 maintains a spring force acting against the upper pull of the locking stud 46, thereby holding it in the locked position as well as preventing the locking stud from rotation. Torsion spring 50 is under sufficient tension in the vertical direction to retain the cooperating tapers 20e and 40d in intimate engagement.

Although a gap spacing of 0.010 inches is maintained between the adjacent surfaces 20h and 40m of the male and female flanges, the stationary terminals 20c-2 provided in female flange 20 extend slightly below surface 20h and the spring loaded cooperating conductive pins 40b-1 extend slightly above surface 40h so as to make firm electrical engagement. Similarly, the pneumatic nipples 40a-1 mate with associated tapered ports 20d-2 in the female flange, the height of the nipples 40a-1 being sufficient to assure a good air-tight connection between the cooperating nipples and ports further aided by the O-ring arranged within an annular recess formed in nipples 40a-1.

Figure 3:
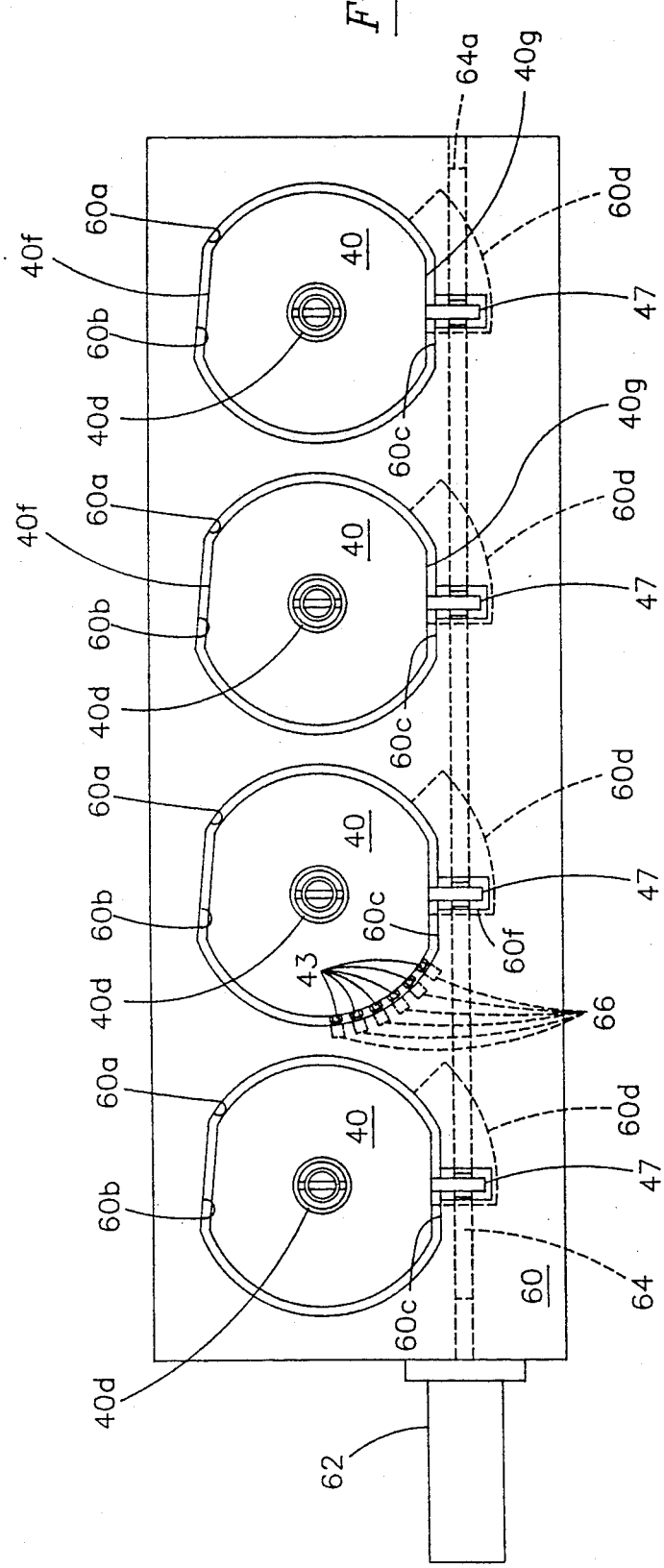
FIG. 3 is a simplified top plan view showing the tool crib for housing the automatic tool changing apparatus of FIGS. 1 and 2.

The conductive gripper identification contacts 43 are engaged by mating sensing contacts 66 in the tool crib 60 shown in FIG. 3. In the preferred embodiment, contacts 43 provide a six bit binary number, the binary number being determined by the presence and/or absence of each of the conductive contacts. The combination of contacts remaining together with those removed serves to uniquely identify the end effector associated therewith.

Figure 4:
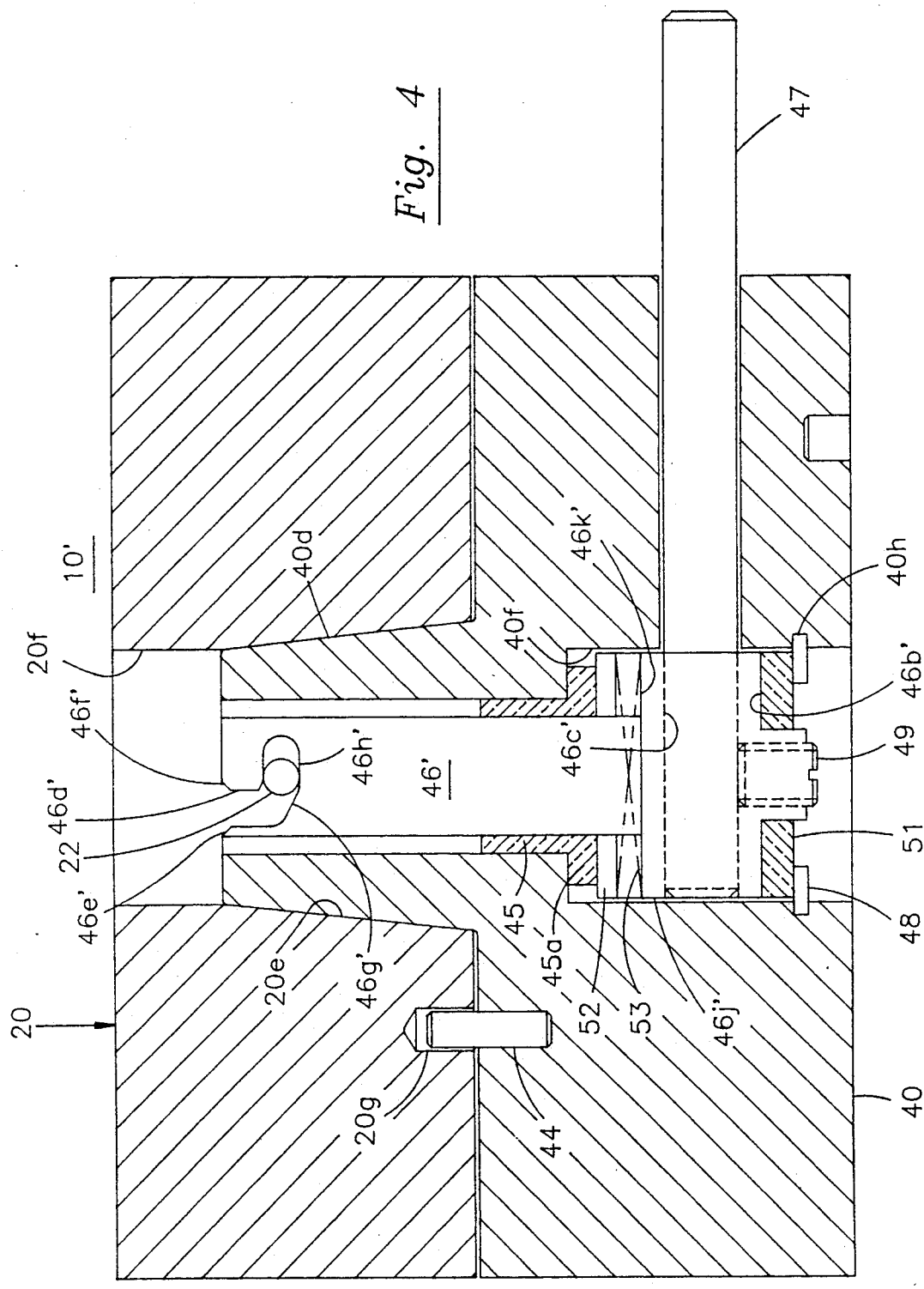
FIG. 4 is a sectional view of another preferred embodiment of the male and female flanges of the present invention.

FIG. 4 shows another alternative embodiment of the present invention in which like elements have been designated by like numerals as between FIGS. 2 and 4. The embodiment 10' of FIG. 4 differs from that shown in FIG. 2 in that the locking stud 46' is provided with a modified insertion slot for locking pin 22 and with a central portion of enlarged diameter as compared with the embodiment shown in FIG. 2.

Locking stud 46' has an upper portion which extends through bushing 45 so as to be freely rotatably therein. The lower end of stud 46' contains a recess 46b' which seats thrust bushing 51 which is held in place by resilient C-clip 48 retained within recess 40h. The portion 46j' of stud 46' is of enlarged diameter relative to the remaining portion of the stud such that its diameter is slightly less than the inner diameter of the cylindrical-shaped opening 40f receiving stud 46'. Opening 46c' receives operating arm 47 in a manner similar to that shown in FIG. 2. A washer 52, preferably formed of a metallic material such as steel, is positioned against flange 45a of bushing 45 and is sandwiched between the upper shoulder 46k' of enlarged diameter portion 46j'. Beneath washer 52 is a wave spring 53 which may, for example, preferably be an annular shaped resilient metallic member having an undulating configuration. Wave spring 53 normally urges locking stud 46' downwardly relative to bushing 45 and washer 52.

The upper end of locking stud 46' is provided with a substantially vertically aligned slot 46d'' and having beveled edges 46e', 46f' at the upper end thereof to aid in the guiding of locking pin 22 into slot 46d''. The lower end of slot 46d'' is provided with two diagonally aligned slots 46g', 46g' which communicate with the lower end of vertically aligned slot 46d'' and extend diagonally downwardly and away from slot 46d'' to receive locking pin 22. The tapered portions 46g', 46g' each terminate in a level portion 46h'. The male flange 40, similar to that shown in FIG. 2, is further provided with a set screw 49 for retaining operating arm 47 in opening 46c'.

The manner in which the male flange 40 of FIG. 4 is coupled to female flange 20 is substantially similar to that of the embodiment of FIG. 2 wherein tapered projection 40d is inserted into tapered opening 20e. Locking stud 46' is aligned to receive locking pin 22. With slot 46f' and locking pin 22 in alignment, male flange projection 40d is moved more deeply into tapered opening 20e until locking pin 22 reaches the tapered portion 46g'. The actuator arm 47 is rotated causing locking stud 46' to pull up on locking pin 22. With the tapered portion seated, locking stud 46' is pulled upwardly against wave spring 53 urging the spring to undergo compression, thus setting the pull-up force. Continued rotation of actuator arm 47 causes locking pin 22 to rest in the flat portion 46h' of the locking stud slot. The internal friction created by the wave spring 53 upon washer 52 and shoulder 46k' retains actuator arm 47 in the locked position. In addition, detent 55 holds locking arm 47 in the locked position against vibration. The arrangement of FIG. 4 compensates for any errors in manufacturing tolerances of the inter-connected members of the flanges as well as significantly reducing wearing of components as a result of repeated use.

Figure 3A:
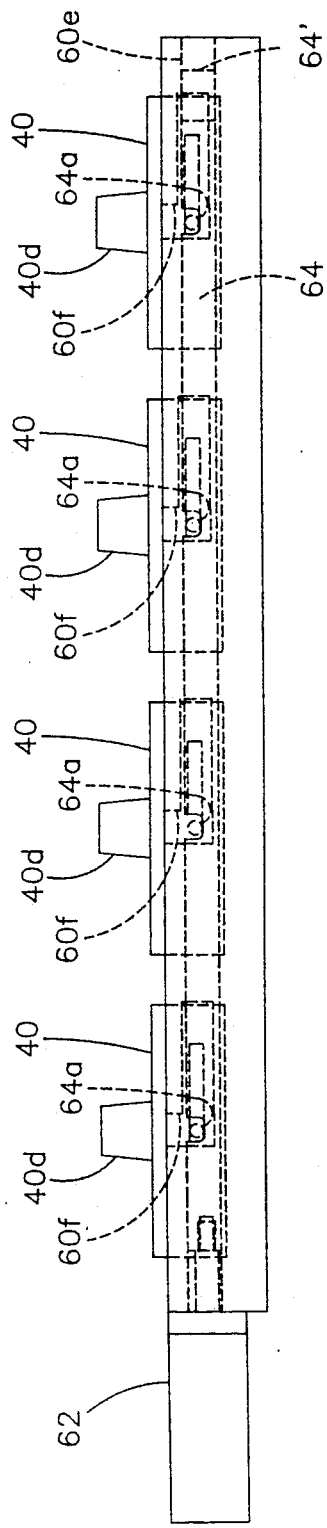
FIG. 3a is an elevational view of the tool crib of FIG. 3.

FIGS. 3 and 3a show the tool crib 60 for storing and automatically coupling and decoupling tools, i.e. end effectors, from robot arms. Tool crib 60 is provided with a plurality of openings 60a each adapted to receive an end effector and cooperating male flange fastened thereto. Each opening is provided with a pair of flats 60b, 60c arranged offset from a diameter of the opening and adapted to cooperate with flats 40f, 40g (see FIG. 1) provided along the periphery of each male flange 40. The tool crib 60 is further provided with a plurality of substantially triangular-shaped slots 60d communicating with an associated one of the openings 60a for permitting the free swingable movement of the operating arm 47 of an associated male flange 40 either of the type shown in FIG. 2 or the type shown in FIG. 4. A single control rod 64 is slidably arranged in elongated slot 60e communicating with each of the triangular-shaped slots 60d to permit reciprocating movement of the elongated control rod 64, which is provided with a plurality of U-shaped slots 64 each adapted to receive the free or right-hand end of the operating arm 47 for each male flange 40. A solenoid-operated control 62 moves the common control arm 64 between an extreme right-hand position shown in solid line fashion as 64a in FIG. 3 and dotted line position 64b in which common control rod 64 is displaced to the left.

Tool crib 60 is further provided with a plurality of elongated, vertically aligned slots 60f to permit control arm 47 to be lifted out of or alternatively returned to the tool crib 60.

The operation of the tool crib 60 is as follows:

The male flanges and their cooperating end effectors are arranged within the tool crib with the flats 40f, 40g of each male flange cooperating with associated flats 60b, 60c in each flange receiving opening. The end effector extends downwardly more deeply into the tool crib and in a cavity (not shown for purposes of simplicity) for housing the end effector.

The control relay 62 is operated to maintain the coupling studs 46 of each male flange in the open position in readiness for receiving a female flange. The robot arm is moved to a position over the desired end effector determined by the sensors 66. When a female flange is lowered into position, as was previously described, and once the rod 22 is seated at the base of the slot 46d, control 62 is operated to rotate all of the operating arms 47 of end effectors stored in tool crib 60, obviously including the operating arm of the male flange receiving the aforesaid female flange, firmly securing and precisely aligning the cooperating male and female flanges relative to one another. The cooperating flats in the tool crib and on the male flange prevent the male flange from rotating during the rotation of the operating arm 47. With all of the operating arms maintained in the locked position, each such arm is in alignment with an associated vertical slot 60f whereupon upward movement of the robot arm with the female flange and end effector now securely attached thereto, moves the male flange and associated end effector which are free to be lifted out of the tool crib and moved to a job site to perform a robotic function.

The disassembly of an end effector takes place in a similar fashion whereby the robot arm with a male flange and end effector coupled thereto is returned to an open tool holder in the tool crib. The end effector and male flange are lowered into the tool holder in the tool crib so that the operating arm 47 is received in the associated vertically aligned slot 60f. Once the male flange and end effector are properly seated within the tool crib, control means 62 is operated to move the operating arm and hence locking stud 46 to the open position whereupon the robot arm and its female flange are disengaged from the male flange and are free to be lifted upwardly and positioned over another end effector and cooperating male flange stored in another tool holder in the tool crib for coupling thereto in order to perform another robotic function.

The selection of an end effector is facilitated by the contacts of group 43 which are sensed by cooperating spring-loaded sensor elements 66 arranged about the inner periphery of each tool crib opening 60a, (only one such set of sensors being shown in FIG. 3 for purposes of simplicity) in order to establish the nature of the end effector stored therein.

Although the tool crib shown is limited to the storage of four (4) end effectors and cooperating male flanges, it should be understood that a greater or lesser number of cooperating end effectors and male flanges may be accommodated.

FIGS. 5a–5h show still another preferred embodiment for the tool crib of the present invention which is comprised of a tool crib 70 capable of holding four tools such as, for example, the tool 90 joined to a flange 40 of the type described hereinabove.

The tool crib is comprised of a plate 72 having one longitudinal side secured to a horizontally aligned frame member F by fasteners 71. Plate 72 is provided with four substantially U-shaped cut-outs 72a–72d each adapted to receive and support a tool within the tool crib, as will be more fully described.

Each cut-out is provided with a pair of centering-/retaining plates 74a, 74b, each resiliently mounted to plate 72 by pairs of fasteners 75a, 75b. Springs $S_1$, $S_2$ allow the centering plates 74a, 74b to yield in the vertical direction to accommodate a certain tolerance in the vertical alignment of a tool flange being moved into or out of the tool crib by a robot arm.

Helical springs 76a, 76b are arranged in openings 74a-1, 74b-1 in centering plates 74a, 74b. A ball detent button $B_1$, $B_2$ is mounted upon the right-hand and left-hand ends of springs 76a, 76b. The annular recess 78 in tool flange 40 is provided with flats 78a, 78b on opposite diametric sides of the tool flange, each flat having a recess or "dimple" 78c, 78d. Guide edges 74a-2, 74b-2 taper inwardly toward the U-shaped opening to assist in centering a tool flange 40 being inserted into the tool crib.

Figure 5F:
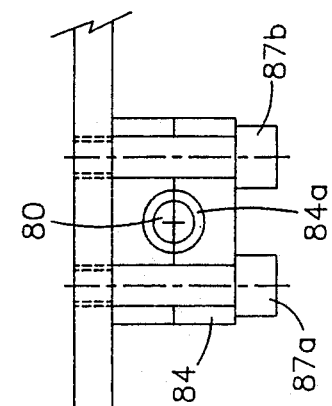
Figure 5B:
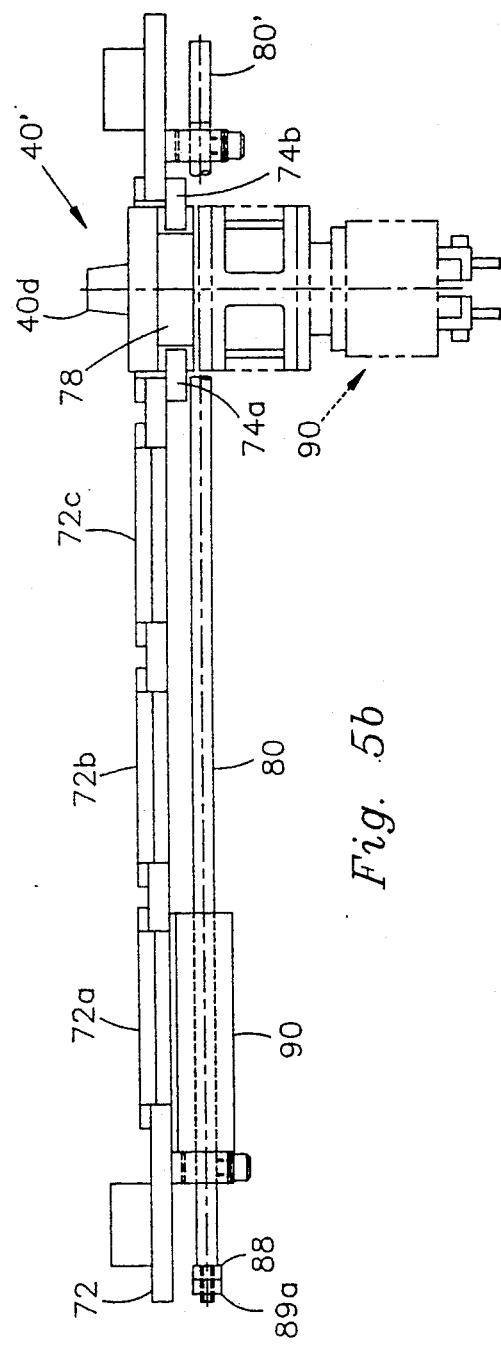

As can best be seen from FIG. 5b, each tool flange is provided with an annular recess 78. A tool is entered into the tool crib 70 by aligning the tool flange such as, for example, the tool flange 40' shown in dotted fashion adjacent one of the tool crib locations and at a height shown by the tool 90 in FIG. 5b. The tool is then moved by the robot arm in the direction shown by arrow A in FIG. 5a. The vertical compliance of plates 74a, 74b allow for vertical placement error of the tool flange by the robot arm. The flats 78a, 78b move along the guide surfaces 74a-3, 74b-3 until the ball detent buttons $B_1$, $B_2$ each enter a dimple 78c, 78d. Microswitches $M_1$, $M_2$, sensitive to the position of a ball $B_1$, $B_2$, provide a signal (for example, by closing) when the flange is locked and seated in the final (proper) position. The orientation of the tool is controlled by the robot arm, as well as the cooperating flats 78a, 78b and guide surfaces 74a-3, 74b-3, to align rod 47 with the toggle assembly associated with the opening into which the flange is inserted.

The tool crib is further provided with an elongated rod 80 mounted for sliding movement through a pair of guide openings 82a, 84a provided in guide brackets 82, 84, respectively. Bracket 82 is secured to the underside of plate 72 by threaded fasteners 86a, 86b. Guide bracket 84 is secured to the underside of plate 72 by threaded fasteners 87a, 87b. The openings 82a and 84a are preferably provided with suitable bearings or low friction sleeves to reduce sliding friction between said openings and the rod 80 to enable the rod 80 to experience reciprocating movement along its longitudinal axis.

The left-hand end of rod 80 is fixedly secured to yoke 88 by threaded nut 89a which threadedly engages the threaded left-hand end of rod 80. Yoke 88 further fixedly secures the piston rod 90a of a cylinder 90 by means of threaded nut 89b which threadedly engages the threaded left-hand end of piston rod 90a. Cylinder 90 is fixedly secured to guide bracket 82. The left-hand end of cylinder 90 is of a reduced diameter and is threaded so as to engage a tapped opening 82b in guide bracket 82. A set screw 92 threadedly engages a tapped opening in guide bracket 82 to retain cylinder 90 secured to bracket 82. Cylinder 90 is provided with ports 90b, 90c which are utilized by the control means for selectively introducing pneumatic pressure into said ports. For example, by introducing pneumatic pressure into port 90c and leaving port 90b open to the atmosphere, piston rod 90a is driven to the left causing rod 80 to be driven to the left. FIG. 5a shows the extreme left-hand position of piston rod 90a and hence rod 80. By introducing pneumatic pressure into port 90b and leaving portion rod 90c open to the atmosphere, piston rod 90a is driven to the right causing rod 80 to be driven from the solid line position shown in FIG. 5a to the dotted line position 80' shown in FIG. 5b wherein rod 80 is shown in dotted fashion at its extreme right-hand end.

A plurality of pairs of toggle assemblies are arranged at spaced intervals along rod 80; a pair of toggle assemblies being provided for each tool receiving location. The toggle assembly pair 94, 96 is shown in simplified fashion in FIG. 5a. The solid line position represents the right-handmost location of the toggle assemblies, i.e., when the rod 80 occupies the dotted line position 80' shown in FIG. 5b. When the piston rod 90a is moved to the extreme left-hand position shown in solid line fashion in FIG. 5a, the toggle assemblies 94 and 96 are moved to the left, toggle assembly 94 occupying the position 94' shown in dotted fashion and toggle assembly 96 occupying the position previously occupied by toggle assembly 94 shown in solid line fashion in FIG. 5a. The toggle assemblies are designed to initially align and maintain the operating arm 47 in the gap space G between the toggle assembly and serve to move the lever arm between the open and closed position in a manner to be more fully described.

Figure 5D:
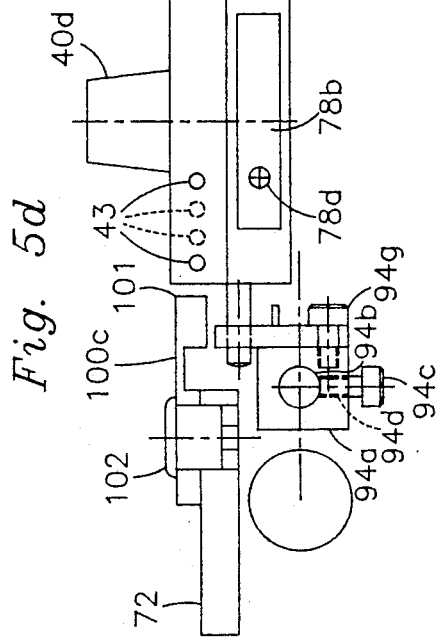
Figure 5E:
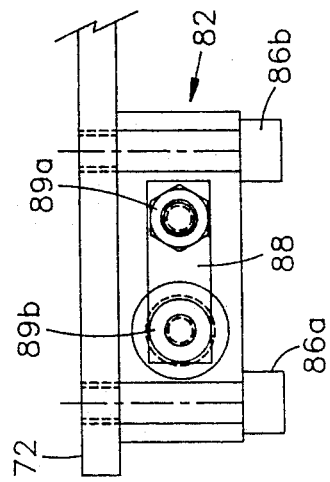
Figure 5C:
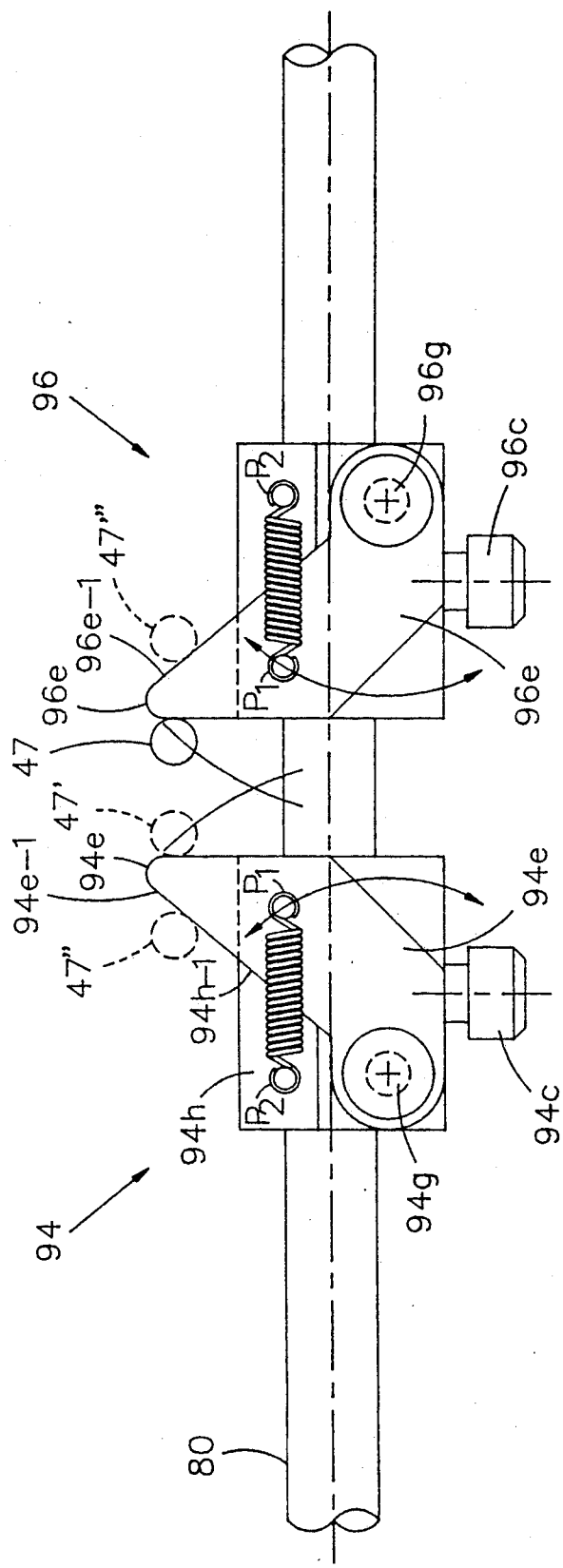

FIGS. 5c and 5d show a pair of toggle assemblies 94 and 96 in greater detail. Considering first toggle assembly 94, as shown best in FIGS. 5a, 5c and 5d, toggle assembly 94 is comprised of a body portion 94a provided with an opening 94b for slideably receiving rod 80. Body 94a is rigidly secured to rod 80 by means of a threaded fastener 94c which engages a tapped opening 94d in body 94a.

A swingable toggle arm 94e is swingably mounted to the front face 94f of body 94a by means of a pin 94g.

Surface 94f has a raised portion 94h having a diagonally aligned side 94h-1 which abuts against the diagonally aligned side 94e-1 of toggle arm 94e to limit movement of the toggle arm 94e in the counterclockwise direction about pin 94g. Biasing spring 94i is coupled to toggle arm 94e by a pin P1 and is coupled to body 94a by pin P2. Spring 94i normally urges toggle arm 94 against the stop 94h-1 while enabling the toggle arm 94e to rotate clockwise against the force of spring 94i in a manner to be more fully described.

Toggle assembly 96 is the mirror image of toggle assembly 94 and like elements have been designated by like alphabetic designations as shown best in FIG. 5c.

The manner of operation of the pair of toggle arm assemblies 94 and 96 is as follows:

Assuming the toggle arm assemblies to be in the solid-line position shown in FIG. 5a and further assuming that a lever arm 47 is positioned in the gap space G between the toggle arms, pneumatic pressure is introduced into port 90c of cylinder 90 causing piston rod 98 and hence rod 80 to move to the left. Toggle assemblies 94 and 96 thus move to the left whereupon lever arm 47 engages the surface 96e-2 of toggle arm 96e. Since toggle arm 96e is resting against the stop surface 96g-1, toggle arm 96e is prevented from moving in the clockwise direction and hence moves lever arm 47 to the left relative to FIG. 5c, hence moving the lever arm 47 counterclockwise about its central axis CA shown in FIG. 5a. Thus, toggle assemblies 94 and 96 occupy their dotted line positions moving the lever arm 47 to the position 47' shown in FIG. 5a.

By introducing pneumatic pressure into port 90b, piston rod 90a and hence rod 80 are moved to the right. At this time, the lever arm 47' engages the vertically aligned surface 94e-2 of toggle arm 94e. The diagonally aligned surface 94e-1 of toggle arm 94e rests against the stop surface 94g-1 preventing the toggle arm from moving counterclockwise thereby moving the lever arm to the right in FIG. 5c, i.e., from the position 47' to the position 47 shown in FIG. 5a.

In the event that a lever arm 47 is positioned outside of the gap space between the stop surface 94g-1 preventing the toggle arm from moving counterclockwise thereby moving the lever arm to the right in FIG. 5c, i.e., from the position 47' to the position 47 shown in FIG. 5a.

In the event that a lever arm 47 is positioned outside of the gap space between surfaces 94e-2 and 96e-2, the system will automatically relocate the lever arm in the following manner:

Let it be assumed that the lever arm occupies the position 47" shown in FIG. 5c. By moving rod 80 to the left, toggle arm 94e swings clockwise against the force of spring 94h due to lever arm 47". As soon as the lever arm 47' clears the tip 94e-3 of toggle arm 94e, toggle arm 94e snaps back to its solid-line position due to the force of the extended spring 94h, swinging in the counterclockwise direction under the force of spring 94h.

Toggle arm 96e operates in a similar manner, i.e., assuming misalignment of the lever arm 47''' outside of the gap space G and to the right of the diagonal side 96e-1 of toggle arm 96. The cycle of operation of the tool crib is such that the piston rod and rod 80 are moved first to the left and then to the right to be assured that all lever arms are appropriately positioned within the gap space. Thereafter, the piston rod is either maintained in its present position, assuming that the tools are to be in the unlocked position (for example, when releasing a tool from a robot arm) or is moved back to the left (assuming that it is desired to couple a tool to a robot arm).

Each tool location is further provided with a substantially C-shaped plate 100 having a semi-circular shaped portion 100a arranged in alignment with the cut-away portions 72a-72d. Each plate is provided with a plurality of openings 100b each arranged coincident with a radius emanating from the central axis CA' of the tool located within the tool crib as shown in FIG. 5a. A pogo (i.e., spring mounted) sensor 101 is arranged within each of the openings 100b and cooperate with pins aligned with each of these sensors for purposes of identifying the type of tool positioned within the crib. As was described hereinabove, selective placements of these identifying pins (for example, see pins 43 in FIGS. 1 and 3) provide a binary code uniquely representing each tool to identify its tool type. The pogo sensors are coupled to control circuitry by means of electrical leads coupling the pogo sensors to the control device, said leads being pulled through and gathered in the recess 100c provided in the underside of plate 100.

Figure 5I:
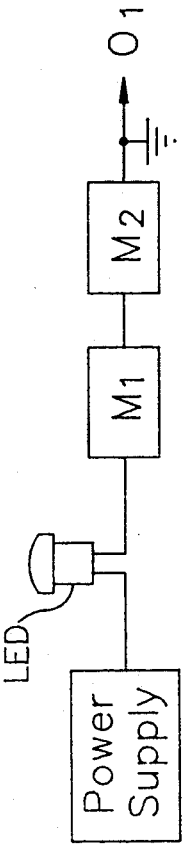
Figure 5G:
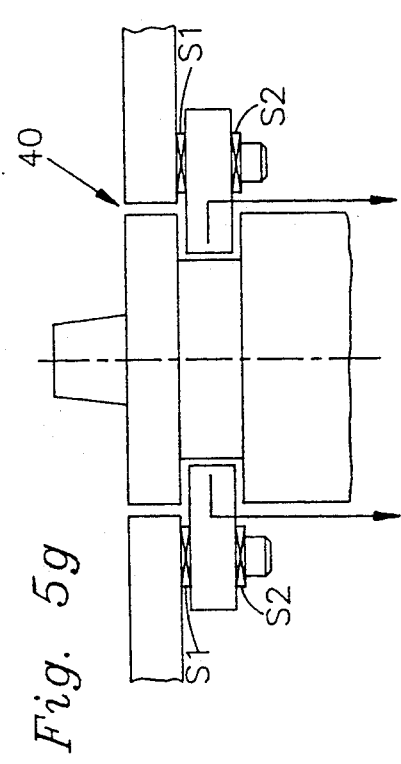
Figure 5H:
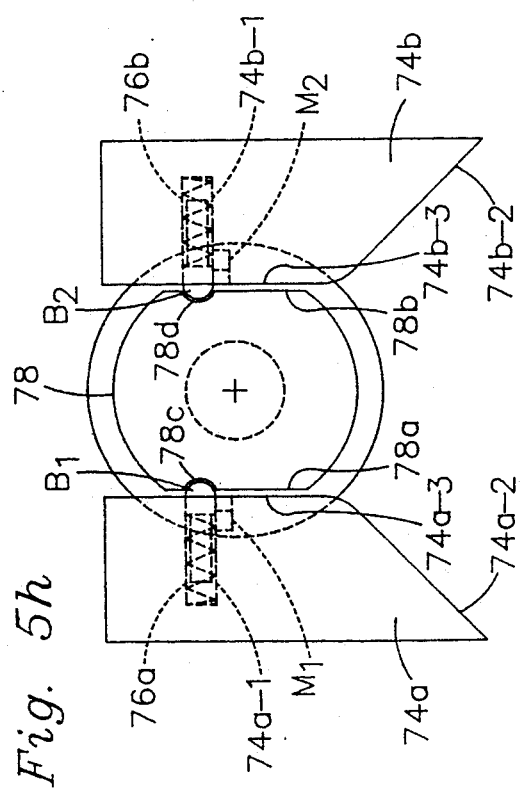

An LED indicator 102 is provided within an opening in plate 100 and is coupled to the system power supply through microswitches $M_1$, $M_2$, for example, for the purpose of visually indicating that the tool 40 is correctly located in its respective slot. Feedback from this LED circuit is connected to the system controller (not shown) at output $O_1$, for example, to indicate the correct placement of tools under program control. See the simplified circuit diagram of FIG. 5i.

The sensing means permit the tools to be located within any tool holding position since the flanges 40 coupled to each tool are identical, the sensing means providing a positive identity of the tool type arranged within each tool holding location. The drive means simultaneously drives the control levers for all tools within the tool crib, it being understood that only the tool being coupled (or uncoupled) from a robot arm will be properly manipulated. Lever arms of those tools not being coupled to (or released from) a robot arm will be moved by their associated toggle assembly, but will nevertheless be retained within the tool holder position by means of the retaining/aligning plates.

The tool, once coupled to the robot arm is removed from the tool crib by reversing the order of movement described previously, namely, by moving the tool from the tool holding position to the position shown by flange 40' in FIG. 5a wherein the tool is cleared from the holding position. The retaining/aligning plates 74a, 74b move against the forces of the retaining springs to permit the flange and tool to slide out of the tool holding position. As soon as the tool is cleared of the tool crib, it may be lifted and thereafter moved to the job site.

A latitude of modification, change and substitution is intended in the foregoing disclosure, and in some instances, some features of the invention will be employed without a corresponding use of other features. Accordingly, it is appropriate that the appended claims be construed broadly and in a matter consistent with the spirit and scope of the invention herein described.

What is claimed is:

1. A tool holder assembly for holding a plurality of tools including a connector assembly fixedly secured to each tool and having a connector means movable between a locked and an unlocked position for connection with apparatus for operating the tool;
   said tool holder assembly including a plurality of openings, each adapted to hold a tool and its cooperating connector assembly;
   each connector assembly having a predetermined peripheral shape;
   each of said openings having a shape generally conforming to the shape of said connector assembly and including means for substantially simultaneously moving the connector means provided in each of said connectors between a locked and an unlocked position.

2. The tool holder assembly of claim 1 wherein each of said connector assemblies is provided with removable identification contacts arranged in spaced intervals about the periphery of each connector assembly; and
   said holder means being provided with sensors in each of said cavities for engaging said identification contacts to identify the specific connector assembly and associated tool arranged within said cavity.

3. The tool holder assembly of claim 1 wherein each connector assembly is provided with a lever arm movable between a first and a second position for respectively locking and unlocking said connector assembly;
   said means for simultaneously moving the connector assemblies comprising an elongated rod and means for moving said elongated rod in opposing directions; and means on said rod for engaging said lever arm to move said lever arm respectively to its locked and unlocked positions as said rod is moved in said first and second directions, respectively.

4. The tool holder assembly of claim 3 wherein said means on said rod comprise first and second toggle assemblies arranged at spaced intervals along said elongated rod and having a swingably mounted toggle arm, each having a lever engaging surface; and each of said lever engaging surfaces being spaced apart to form a gap space for receiving a lever arm.

5. The tool holder assembly of claim 4 wherein said toggle arms are each biased in opposing directions;

each toggle assembly being further provided with a stop for limiting the movements of one of said toggle arms in the clockwise direction and the other of said toggle arms in the counterclockwise direction to enable each toggle arm to yield when engaged by a lever arm which is positioned outside of said gap space to thereby enable a lever arm to be automatically relocated within said gap space by reciprocating movement of said rod.

6. The tool holder assembly of claim 2 wherein said sensors comprise pogo type sensors normally occupying a first position adjacent the connecting flange and yieldable to move to a second position away from said flange in the presence of an identification contact, the relative positions of said sensors providing a binary code representative of the tool type sensed by said sensor means.

7. The tool holder assembly of claim 3 further comprising cylinder means having a reciprocating piston rod; and yoke means coupling said piston rod to said elongated rod for reciprocating said elongated rod.

8. The tool holder assembly of claim 4 wherein said toggle assemblies are each provided with a body portion having an opening receiving said rod and being slideable therealong; and set screw means for securing said body to said rod in any predetermined position therealong.

9. The tool holder assembly of claim 8 wherein each toggle assembly further comprises means for swingably mounting said toggle arm to said body.

10. The tool holder assembly of claim 9 wherein said body is provided with a projection which serves as a stop; and bias means coupled between said body and said toggle arm and normally urging said toggle arm against said stop.

11. The tool holder assembly of claim 3 further comprising first and second guide means for slideably mounting said elongated rod to enable said elongated rod to experience reciprocating movement along a predetermined axis.

12. The tool holder assembly of claim 11 further comprising bearing means arranged in said guide means to facilitate sliding movement of said elongated rod.

13. The tool holder assembly of claim 1 further comprising a mounting plate having a plurality of U-shaped slots along one side thereof, each slot being adapted to receive and support a connector.

14. The tool holder assembly of claim 13 wherein said connector is provided with a recess having detent receiving means;

each of said U-shaped slots having detent means snapped fittingly received by said detent receiving means when a connector is properly positioned within a U-shaped slot.

15. The tool holder assembly of claim 14 wherein said connector has a generally cylindrical-shaped periphery, said recess comprising a substantially circular recess extending about said periphery; and the retainer plates associated with said U-shaped slot extending into said recess for centering said connector within the associated U-shaped slot and preventing linear movement of a connector along its longitudinal axis.

16. The tool holder assembly of claim 15 wherein said recess is provided with flats on opposite diametric sides thereof, each of said flats having one of said receiving means therein;

said detent means each being mounted along one of said retainer plates.

17. The tool holder assembly of claim 16 wherein each retainer plate is provided with an opening;

each detent means comprising bias means mounted in said opening and having a detent ball button mounted upon said bias means whereby said bias means urges said detent ball button toward said recess.

18. The tool holder assembly of claim 17 wherein said detent receiving means each comprises a dimple.

19. The tool holder assembly of claim 13 further comprising retainer plates arranged on opposite sides of each of said U-shaped slots, bias means resiliently mounting each retainer plate to allow each retainer plate to experience some vertical displacement up or down to accommodate for vertical misalignment of a connector being inserted into a U-shaped slot.

20. The tool holder assembly of claim 14 further comprising means for providing an electrical indication when a connector is properly positioned within a U-shaped slot.

21. The tool holder assembly of claim 20 wherein said means for providing an electrical signal comprises sensing means for sensing the position of said detent means.

22. The tool holder assembly of claim 21 wherein said sensing means comprises microswitches, each adapted to sense the position of an associated detent means.

23. The tool holder assembly of claim 14 wherein each of said retainer plates is provided with diagonally aligned leading edges which taper inwardly toward the recess of a connector to serve as guide means for guiding a connector into a U-shaped slot.

24. The tool holder assembly of claim 1 wherein each connector is provided with a connector operating arm movable between a locked and unlocked position.

25. The tool holder assembly of claim 24 wherein each connector is provided with detent means for maintaining its locking arm in the locked position.

26. The tool holder assembly of claim 25 wherein said detent means comprises a substantially U-shaped resilient detent member having a yoke and first and second integral arms extending from said yoke;

the free end of one of said arms and said yoke being secured to said connector;

the free end of the remaining arm having a rounded projection extending into the path of movement of said locking arm and being displaced from said path of movement when said locking arm moves to the locked position, said rounded projection preventing movement of said locking arm from the locked position due to vibration.

27. The tool holder assembly of claim 4 wherein said first and second toggle assemblies are adjustably movable along said elongated rod; and
    means for locking each of said toggle assemblies to said elongated rod.

28. The tool holder assembly of claim 1 wherein each connector assembly is comprised of a flange having a tapered projection for receiving a robot arm flange;
    said robot arm flange having a tapered opening and a stationary coupling means extending across said opening;
    said flange having said tapered projection adapted to be inserted into said tapered opening;
    said tapered projection having radially aligned slots for receiving said coupling means;
    locking means arranged for movement within said tapered projection and having a receiving portion for receiving said coupling means;
    said locking means being movable to a first position causing said coupling means to draw said tapers into intimate contact and a second position for releasing said coupling means, under control of said means for moving the connector means.

29. A method for coupling a tool to a robot arm, said tool being arranged within a tool holder, said tool including a mounting flange having a tapered projection and locking means arranged for movement within said tapered operating arm extending outwardly from the periphery of said flange, said robot arm having a female flange with a tapered opening adapted to receive said tapered projection, said method comprising the steps of:
    moving said robot arm to place said robot arm flange above said tapered projection;
    moving said robot arm downwardly when said robot arm flange opening is aligned with said tapered projection whereby said tapered projection enters into said tapered opening;
    moving said operating arm from the unlock position to the locked position to lock said tool flange to said robot arm flange; and
    moving said robot arm to displace said tool flange from said tool holder, whereupon said robot arm is thereafter free to be moved to a location in a workspace for performing an operation according to the tool coupled thereto.

30. A method for uncoupling a tool from a robot arm through the use of a tool holder having a tool receiving opening, said tool including a mounting flange having a tapered projection and locking means arranged for movement within said tapered projection, said locking means having an operating arm extending outwardly from the periphery of said flange, said robot arm having a female flange with a tapered opening receiving said tapered projection, said method comprising the steps of:
    moving said robot arm to place said robot arm above said tool holder opening;
    moving said robot arm downwardly when the tool coupled to said robot arm is aligned with said tool holder opening whereby said tool and tool mounting flange enter into said tool holder opening;
    moving said operating arm from the locked position to the unlocked position to unlock said tool flange from said robot arm flange;
    moving said robot arm to displace said robot arm flange from said tool holder, said robot arm thereafter being free to be moved to another location in a workspace for performing a subsequent operation.

31. A tool holder assembly for holding tools including a connector assembly fixedly secured to each tool and having a connector means movable between a locked and an unlocked position for connection with apparatus for operating the tool;
    said tool holder assembly including an opening adapted to hold a tool and its cooperating connector assembly;
    each connector assembly having a predetermined peripheral shape;
    said opening having a shape generally conforming to the shape of said connector assembly and including means for substantially simultaneously moving the connector means provided in each of said connectors between a locked and an unlocked position;
    each connector assembly having an annular slot with a pair of flats arranged on opposite sides of said slot;
    said tool holder assembly having a pair of guide plates affixed on opposite sides of said opening for slidably engaging one of said flats in said slot;
    detent means arranged in each guide plate;
    dimple means in each of said flats; each of said detent means being snap-fitted into one of said dimple means when the connected assembly is properly seated in said opening;
    sensing means responsive to said detent means being snap-fitted into an associated dimple means for providing an output; and
    signal means responsive to the outputs of said sensing means for providing a signal that a connector assembly is properly seated in said opening.

32. The assembly of claim 31 wherein said signal means includes a light emitting diode.

33. The assembly of claim 31 wherein said sensing means comprises a microswitch for providing an output indication when associated detent means is snap-fitted into a dimple means.

* * * * *

UNITED STATES PATENT AND TRADEMARK OFFICE
CERTIFICATE OF CORRECTION

PATENT NO. : 5,018,266
DATED : May 28, 1991
INVENTOR(S) : Hutchinson, et. al.

It is certified that error appears in the above-identified patent and that said Letters Patent is hereby corrected as shown below:

Column 8, line 59, "rotatably" should be --rotatable--

Column 9, line 11, "46f" should be --46f'--

Column 9, line 26, "46f" should be --46f'--

Signed and Sealed this

Twenty-third Day of February, 1993

Attest:

STEPHEN G. KUNIN

*Attesting Officer*  *Acting Commissioner of Patents and Trademarks*